No. 754,781. PATENTED MAR. 15, 1904.
J. H. KINDSVATER.
HOISTING MECHANISM FOR STACKERS.
APPLICATION FILED JULY 22, 1903.
NO MODEL. 5 SHEETS—SHEET 1.
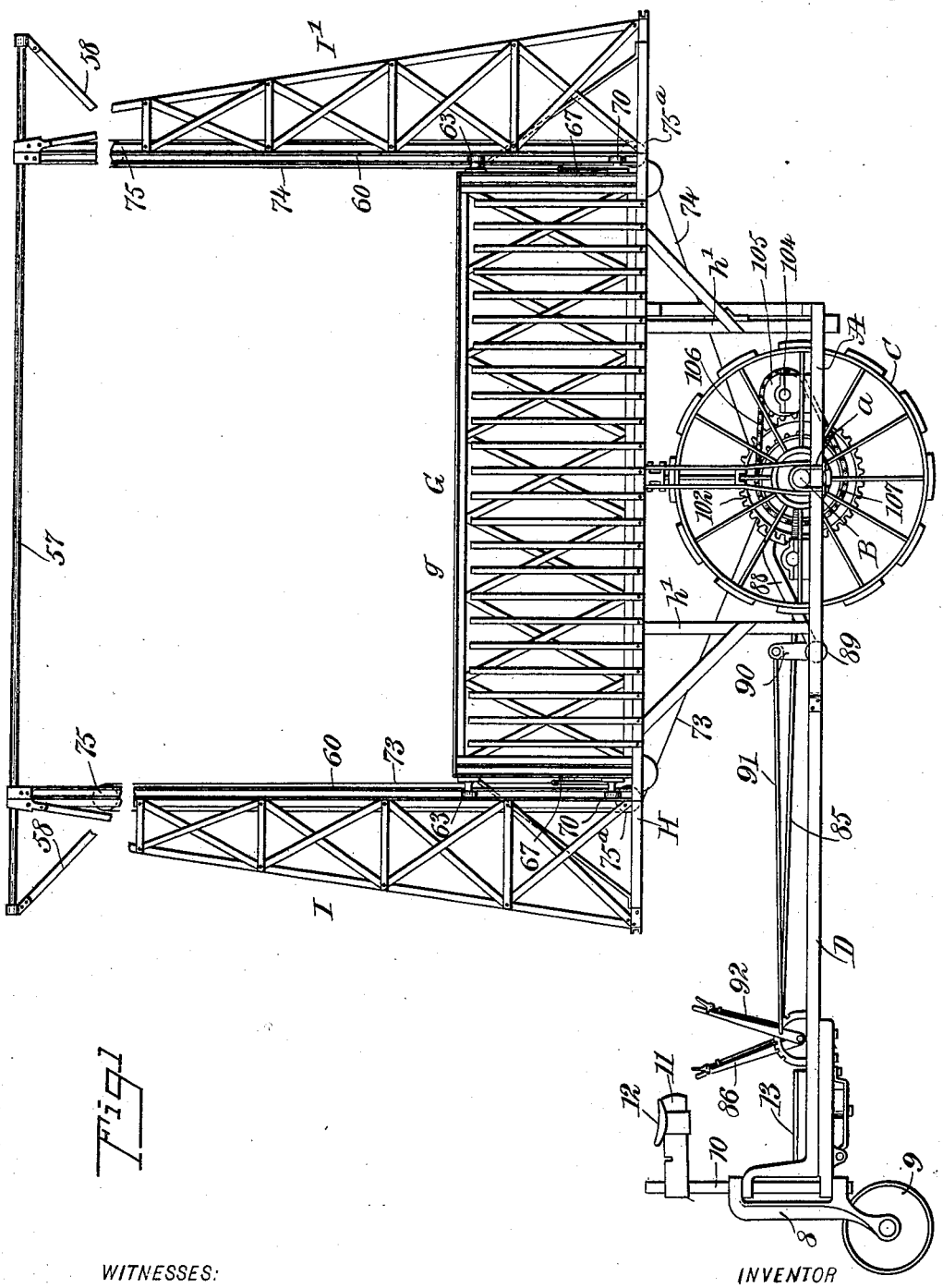
WITNESSES:
J. H. Brophy
W. J. Benchard
INVENTOR
John H. Kindsvater
BY
[signature]
ATTORNEYS.

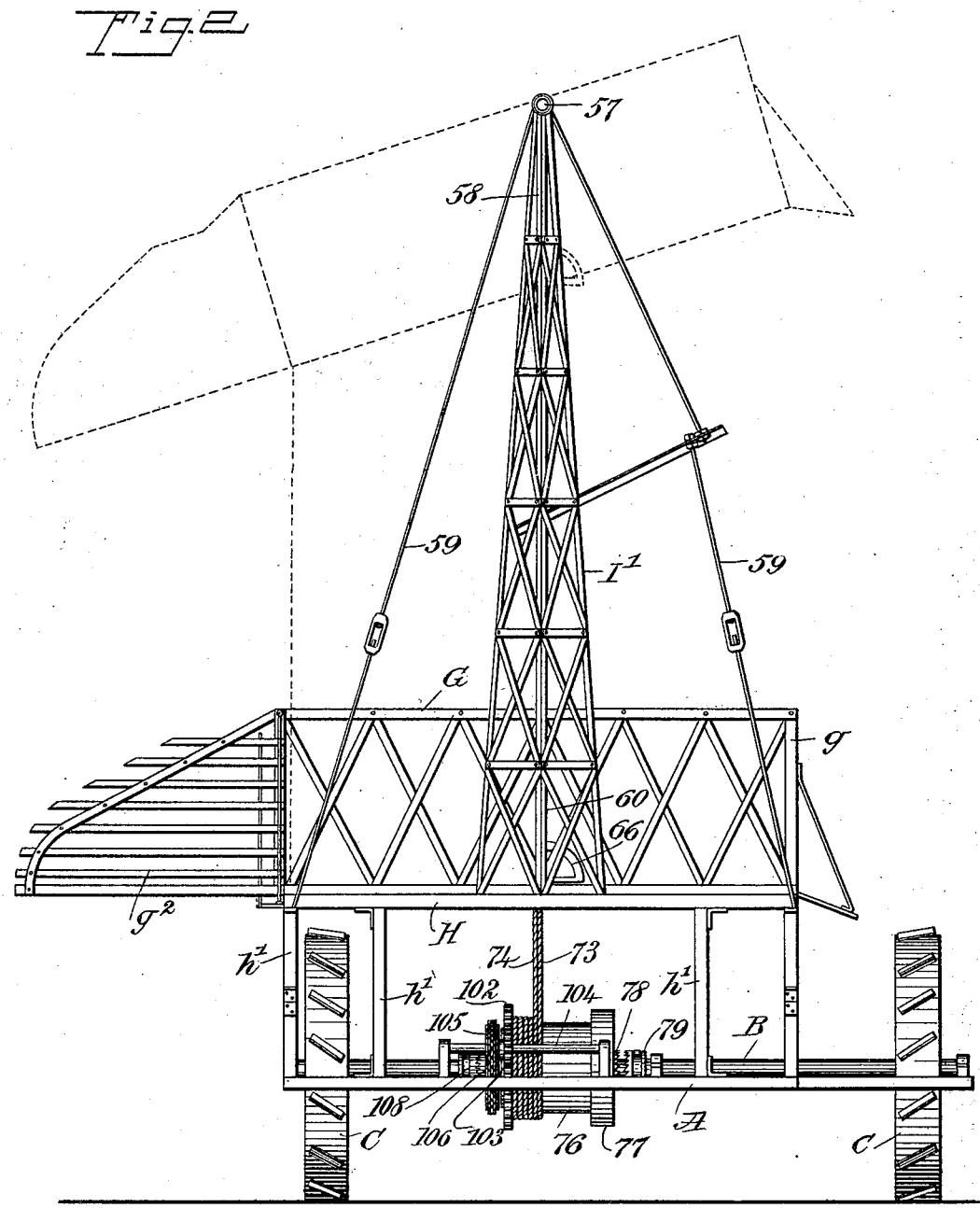

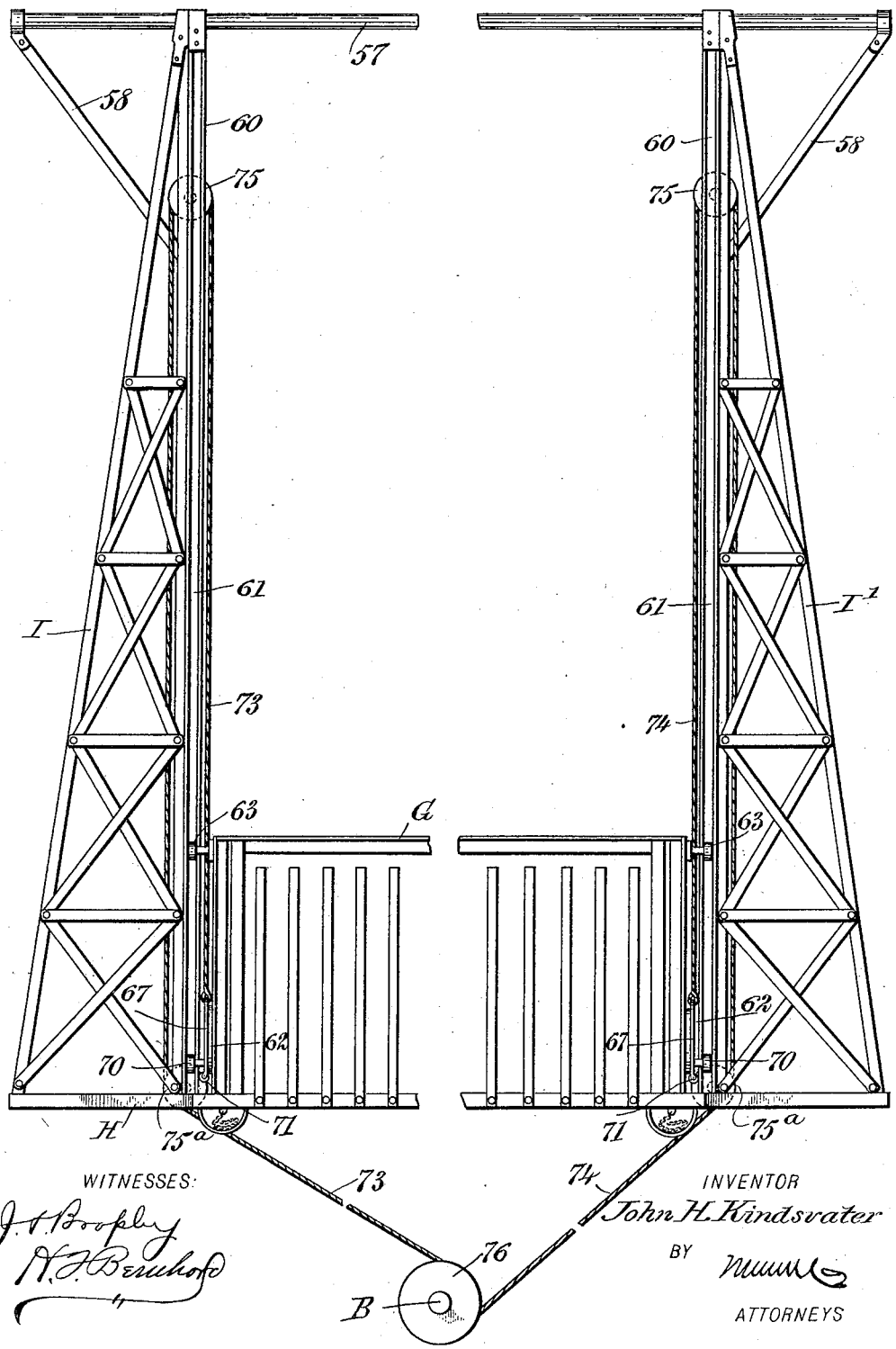

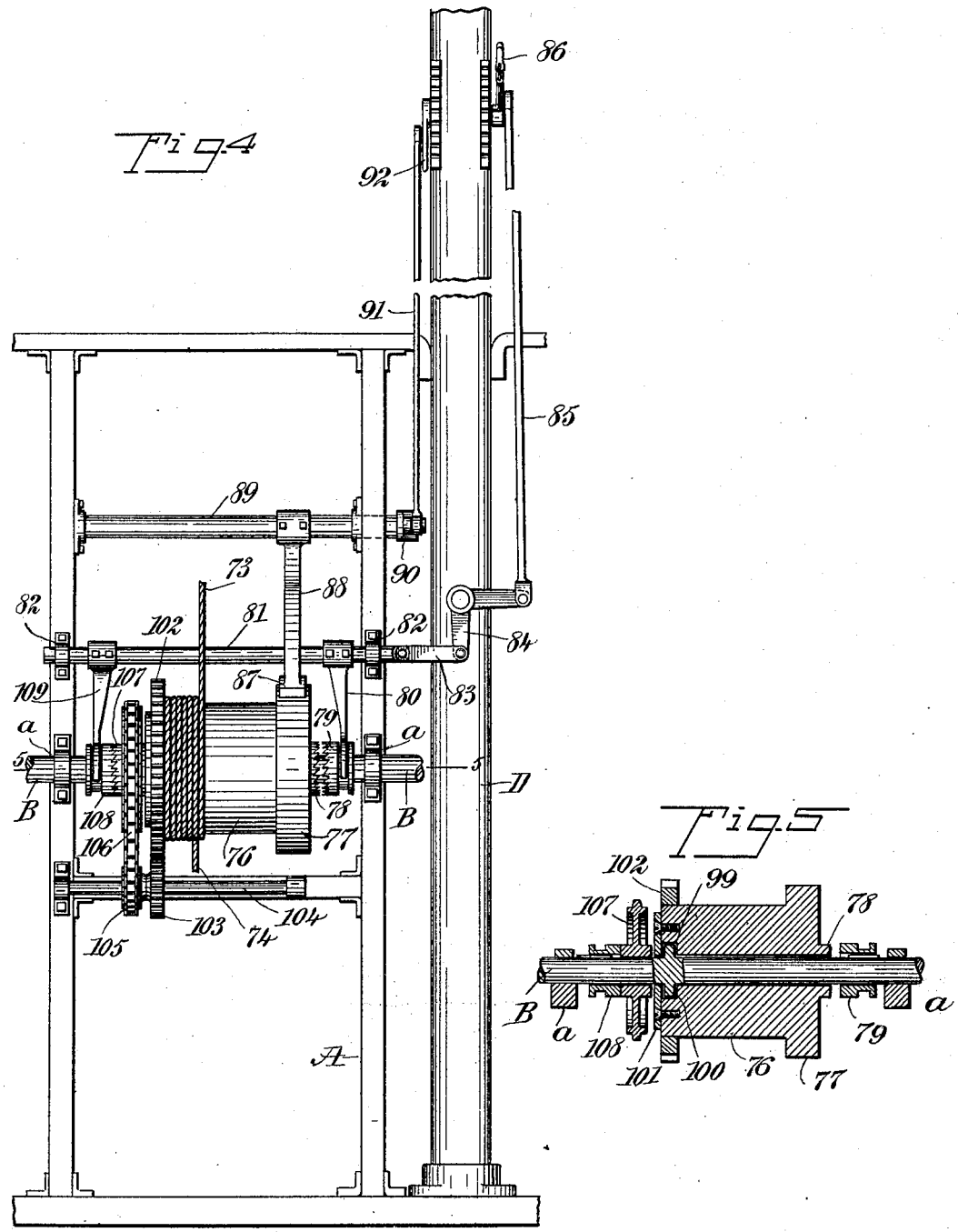

No. 754,781. PATENTED MAR. 15, 1904.
J. H. KINDSVATER.
HOISTING MECHANISM FOR STACKERS.
APPLICATION FILED JULY 22, 1903.
NO MODEL. 5 SHEETS—SHEET 5.
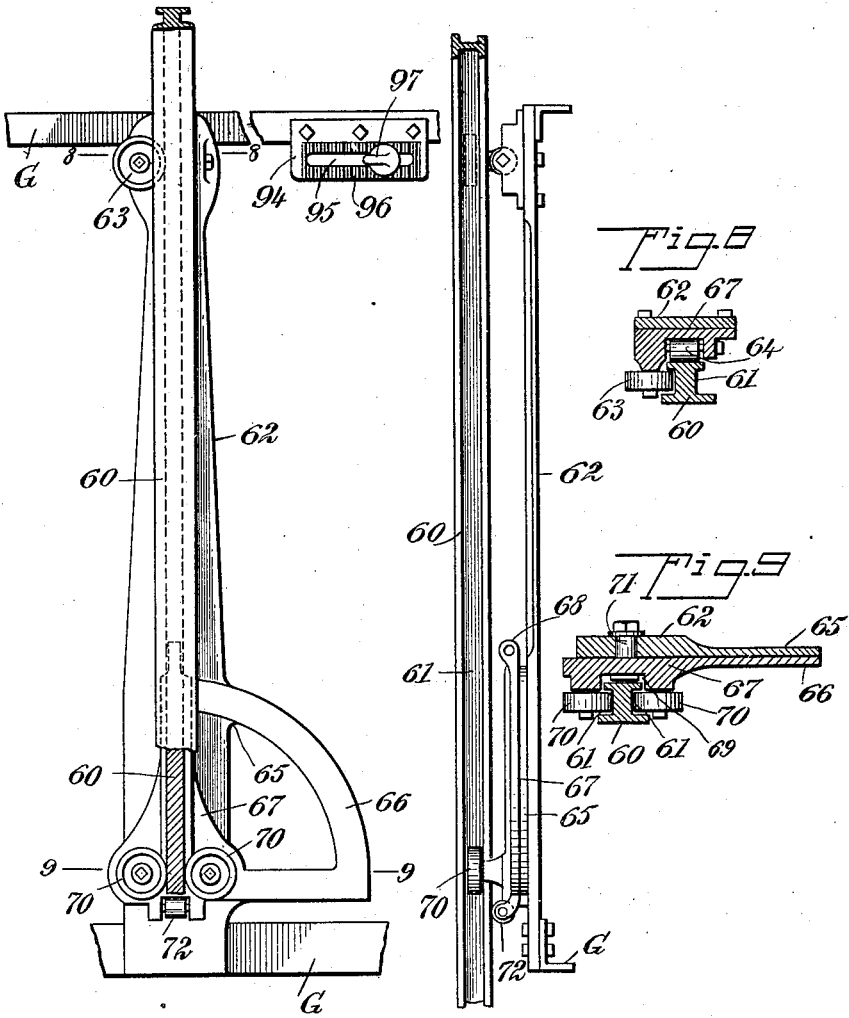
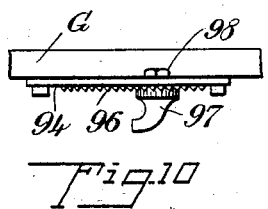
WITNESSES:
INVENTOR
John H. Kindsvater
BY
Munn & Co.
ATTORNEYS.
THE NORRIS PETERS CO., PHOTO-LITHO., WASHINGTON, D. C.

No. 754,781. Patented March 15, 1904.

UNITED STATES PATENT OFFICE.

JOHN HENRY KINDSVATER, OF ELLIS, KANSAS.

HOISTING MECHANISM FOR STACKERS.

SPECIFICATION forming part of Letters Patent No. 754,781, dated March 15, 1904.

Original application filed October 4, 1902, Serial No. 125,948. Divided and this application filed July 22, 1903. Serial No. 166,585.

(No model.)

*To all whom it may concern:*

Be it known that I, JOHN HENRY KINDSVATER, a citizen of the United States, and a resident of Ellis, in the county of Ellis and State of Kansas, have invented a new and Improved Hoisting Mechanism for a Combined Harvester and Stacker, of which the following is a full, clear, and exact description.

My invention relates to an improved construction of hoisting mechanism for combined grain harvesters and stackers.

The subject-matter of this application constitutes in part a division of a prior application filed by me on October 4, 1902, Serial No. 125,948, for a combined grain harvester and stacker, wherein I have shown a portable machine especially designed for harvesting grain in the field, transporting the load to the point of stacking, and elevating and dumping the load upon the stack. This machine in its broad aspect comprises in its construction a main wheeled frame, a cutter apparatus on such frame, an up-and-down-movable barge or receptacle, and suitable conveyer mechanism for transferring the harvested grain from said cutter apparatus to said barge.

The present improvements are directed to a means for slidably guiding the up-and-down movement of the barge and permitting the same when raised to have a dumping or tiltable movement in order to discharge the load, to means for elevating or hoisting the loaded barge by the movement of the machine, and to devices whereby the hoisting mechanism and the barge may be controlled to good advantage by the services of a single operator.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1 is a side elevation of a portion of a combined harvester and stacker, omitting the cutter apparatus and the conveyer mechanisms forming a part of the machine disclosed by my prior application. Fig. 2 is a front elevation of the machine with the cutter apparatus and the conveyer mechanisms omitted. Fig. 3 is an enlarged detail view in elevation, illustrating the arrangement of the hoisting-cables and the winding-drum with relation to the up-and-down-movable barge and the towers. Fig. 4 is an enlarged plan view of a part of the machine, showing the improved hoisting mechanism. Fig. 5 is a longitudinal sectional elevation through the main axle, the hoisting-drum, and certain parts which are associated with said drum. Fig. 6 is a side elevation of one of the traveling carriages for the vertically-movable barge. Fig. 7 is another elevation looking at the left-hand side of Fig. 6. Figs. 8 and 9 are horizontal sectional views taken in the planes of the dotted lines 8 8 and 9 9, respectively, of Fig. 6; and Fig. 10 is a detail view of an adjustable form of stop which is carried by the tiltable barge and is adapted for engagement with one of the track-rails to be hereinafter described.

As disclosed by my prior application, the combined harvester and stacker is provided with a main frame A of any suitable construction, said frame having suitable bearings $a$ for the accommodation of the main axle B. This axle is equipped with the carrying-wheels C, and the entire frame is supported or carried by this wheeled axle and by a tiller-wheel 9. This tiller-wheel is journaled in the lower end of a swiveled hanger 8, the latter being connected by a vertical spindle 10, which is mounted in a suitable way at the rear end of a push-pole D, said pole being joined to or forming a part of the main frame A. The upper end of the spindle 10 has a forwardly-extending arm 11, on which may be mounted a driver's seat 12. A standing-platform 13 is secured to the rear end of the push-pole D, and on this pole are supported the necessary number of levers required for the operation and control of the hoisting devices, as will hereinafter appear.

The frame A carries a cutter apparatus and a platform-conveyer, said conveyer being arranged in the rear of the cutter apparatus and adapted to transfer the material to a suitable elevator mechanism by which the harvested grain is discharged into an elevated barge or receiver G; but as the cutter apparatus and the conveyer mechanisms do not form a part of the present invention and are fully disclosed in my aforesaid application I have not considered it necessary to illustrate said mechanisms in the drawings. The frame A also carries a horizontal platform H, which is supported in a raised position above the frame, the cutter apparatus, and the conveyer mechanism associated therewith by means of a suitable number of posts or standards $h'$. The elevated platform H and the means for supporting the same are of metallic construction to secure strength and rigidity.

The receiver G is of metallic construction, comprising a skeleton framework and a sheet-metal lining; but in the drawings the lining is omitted for the sake of clearness in illustrating certain parts of the machine. This receiver is arranged to fit between vertical towers I I', which are secured firmly to the elevated platform H at the sides thereof. Said receiver or barge is arranged so that its transverse axis is out of line with the median line of the towers, thus disposing the barge in an eccentric relation to said towers. One end of the barge is closed, as indicated at $g$; but the other end thereof is open in order that the load of grain may be discharged from the barge when it is tilted subsequent to the operation of hoisting the barge bodily in a vertical direction. The open end of the barge is provided with side wings $g^2$, which are of slatted construction and are fastened in any suitable way to the side portions of the barge, said wings serving to prevent the grain from blowing off the sides of said barge and upon the sides of the stack in the operation of discharging the grain upon the latter.

The towers I I' are of lattice-work construction, and they are united at their upper ends by a transverse horizontal brace 57. The end portions of this brace are extended beyond the towers, and to these end portions of the brace are fastened inclined stays 58, the latter being secured to the towers below the horizontal brace 57. The towers are also braced by the employment of strengthening-rods 59, which have their lower ends fastened to the fixed horizontal floor H; but, if desired, any other kind of brace may be used to strengthen the elevated towers.

Within the towers I I' are disposed vertical guide-rails 60, said rails being arranged individually within the towers and in the middle portions thereof. These rails are fastened securely to the towers and to a part of the elevated floor or platform H, each rail being in the form of an ordinary T-rail, said rail being shown by Figs. 6 to 9, inclusive, as having longitudinal channels 61 in its respective faces. The barge G lies between and in close relation to the vertical rails 60 to occupy the described eccentric relation thereto, thus making the inner closed end $g$ of the barge heavier when loaded with grain than the open end, through which the grain is adapted to be discharged.

On opposite sides of the barge G are provided the vertical guide-plates 62, one of which is secured rigidly to each side of the barge on the outside thereof, said guide-plates being disposed in alinement with each other transversely across said barge or receiver. The vertical guide-plates are provided at their upper ends with guide-rollers 63 64, one guide-roller of each pair being arranged to travel in a channel 61 of one of the guide-rails 60. The other guide-roller, 64, of each pair is mounted in a recess, which is provided in the vertical plate 62, so that the axis of said roller 64 is at right angles to the axis of the roller 63, and this roller 64 is arranged to ride against one face of the guide-rail 60, as shown by Figs. 7 and 8. The lower end of each vertical guide-plate 62 is provided with a segmental offset 65, said offset forming a foot which is disposed in overlapping relation to a segmental guide 66, the latter being provided as or made a part of a suspension-plate or carriage 67. (See Figs. 6 and 9.) A pair of these suspension-plates or carriages 67 are provided, the same being adapted to the respective guide-rails 60 within the towers I I', and each plate or carriage is provided at its upper end with an eye 68. The suspension-plates or carriages are fashioned or recessed at 69 in order to partially fit around the guide-rails 60, as shown by Figs. 6 and 9, and the plates are furthermore equipped with the pairs of rollers 70 and with other rollers 72. The rollers 70 of each carriage are loosely mounted thereon in positions to fit in the channels 61 of the rails 60, while the rollers 72 are arranged at angles to the rollers 70 and are adapted to ride against one face of the guide-rails 60, respectively, whereby the carriages are provided with rollers which travel freely on the rails for the purpose of permitting the desired vertical movement of the carriages on said rails, and at the same time the carriages are prevented from having displacement laterally or edgewise with respect to said rails.

It will be understood that the carriages are free to travel vertically on the rails and that they cannot have any tilting movement thereon. The guide-plates 62, which are fast with the respective sides of the barge, are connected pivotally with the carriages or suspension-plates 67, said pivotal connections being afforded by the employment of bolts 71, one of which passes through the lower end of each vertical plate 62 and through the suspension-plate or carriage 67, as shown by Fig. 9.

It will be seen that the barge is pivotally connected to the pair of carriages 67 by bolts 71, which are eccentrically located with respect to said barge. In the service of the apparatus the guide-plates 62 move or tilt with the barge when it is turned to the dumping position, (shown by dotted lines in Fig. 2;) but the suspension-plates or carriages 67 remain in predetermined vertical positions on the guide-rails 60. During the tilting adjustment of the barge and the vertical guide-plates 62, which are movable with said barge, said plates and the rollers 63 64 are adapted to move away from the guide-rail 60, said rollers 63 moving away from the channeled faces 61 of the rails, while the rollers 64 move across the other faces of said rails. When the barge is drawn back to a horizontal position, the guide-plates 62 and the rollers 63 64 are moved into positions alongside of the rails 60 and the guides 66 of the suspension-plates or carriages 67. The tilting movement of the barge and the vertical plates 62 thereof is quite limited in order that the feet 65 of the plate 62 may remain in overlapping engagement with the guide 66 of the carriages, whereby said guides prevent any lateral displacement of the barge when it is turned on the axis afforded by the pivotal bolts 71.

The eyes 68 at the upper ends of the suspension-plates or carriages provide for the attachment of hoisting-cables 73 74 or their equivalents. (See Figs. 1 and 3.) These cables extend upward from the carriages within the towers, and they pass over suitable guide-sheaves 75, the latter being supported at the upper ends of the towers, as shown by Fig. 3. The cables after passing upwardly over the sheaves are carried downwardly within the towers below other guide-sheaves 75$^a$, which are supported at the lower ends of the towers and substantially in the horizontal plane of the platform H. From these lower sheaves 75$^a$ the cables 73 74 converge toward the axle B and the winding-drum 76, which is mounted on said axle, the lower ends of said cables 73 74 being coiled on the drum, thus making provision for the simultaneous winding of the two cables in a manner to raise or lower the barge with relation to the horizontal floor H and the guide-rails 60.

The winding-drum 76 is mounted loosely on the axle, as shown by Figs. 4 and 5, said drum being provided with a brake-surface 77 near one end and with a clutch-face 78. With this clutch-face of the drum is adapted to engage a slidable clutch 79, which is splined to the axle B, so as to rotate therewith and to be capable of sliding movement thereon. This clutch is shiftable with a clutch-arm 80, the latter being made fast to a shipper-rod 81. Said shipper-rod is supported for slidable or endwise movement in suitable bearings 82, which are fastened on a part of the main frame A, and to one end of this shipper-rod is pivoted a link 83, the other end of which is connected pivotally to one arm of a bell-crank lever 84. Said lever is fulcrumed at its knee to the push-pole D or to a part of the frame, and to the other arm of this lever is pivoted one end of a pitman 85, the other end of which pitman is pivoted to a clutch-shipping lever 86, which is fulcrumed on the push-pole D at a point within convenient reach of the operator standing on the platform 13.

The brake-surface 77 of the winding-drum 76 is adapted for engagement by a brake-shoe 87, which is provided at the free end of a swinging brake-lever 88, the latter being fastened in a suitable way to a rock-shaft 89, which is mounted in the frame A. One end of this rock-shaft has an arm 90, to which is pivoted the front end of a pitman 91, the latter being extended along the push-pole D and pivoted to a brake-lever 92.

The tilting movement of the barge is limited in one direction by the employment of adjustable stop devices. (Shown by Figs. 6 and 10.) On each side of the barge, at the upper portion thereof, is firmly secured a stop-plate 94, the latter lying in the rear of the vertical guide-rail 60. This stop-plate is provided with a longitudinal slot 95, and on the face of this plate is a series of teeth or corrugations 96. A stop 97 is provided with a shank and with an enlarged base having a toothed or corrugated face. The shank of the stop is adapted to pass through the slot 95 of the plate and to receive a binding-nut 98, while the toothed base of said stop has interlocking engagement with the teeth 96 of the slotted plate, whereby the stop may be interlocked with or fastened to the plate 94 to occupy different positions thereon with relation to the rail 60. When the barge is tilted in one direction on the axis afforded by the bolts 71, the stops 97 move with said barge and engage with the rails 60 in order to limit the tilting movement of the barge, and said stops may be adjusted in the slotted plates for the purpose of regulating the tilting movement of the barge within certain limits.

The drum 76 is provided in one end with a recess 99, which is adapted to loosely receive a collar 100, that is clamped to the main axle B or is made integral therewith, as in Fig. 5, and against the recessed end of the drum is firmly secured a face-plate 101, the latter being arranged to closely embrace the axle B. The collar 100 fits loosely within the recessed end of the drum for the purpose of holding the latter against endwise movement or displacement on the axle B.

From the foregoing description it will be understood that the clutch 79 may be adjusted into engagement with the clutch-face 78 of the drum by proper manipulation of the lever 86 for the purpose of making said drum 76 fast with the axle B, and thereby rotate said drum 76, so as to coil the cables 73 74 thereon and raise the barge when the machine is moved in a forward direction. The reverse or downward movement of the barge after the load shall have been discharged therefrom is controlled by the axle through a train of speed reducing and controlling gears which may be brought into service at the proper time. One member of this train is a spur-gear 102, which is made fast with the drum 76 at the opposite end from the brake-surface 77 thereof. This gear 102 meshes with a spur-gear pinion 103, which is made fast with a counter-shaft 104, journaled in suitable bearings on the frame A. The said counter-shaft is also provided with a sprocket-gear pinion 105, with which engages a sprocket-chain 106, the latter having engagement with a large sprocket-gear 107, which is mounted loosely on the axle B adjacent to the recessed end of the drum. Said loose sprocket-gear 107 is provided with a clutch-face adapted for engagement by a slidable clutch 108, which is splined to the axle B for rotation therewith, and this clutch is loosely engaged by a shipper-arm 109, which is made fast with the endwise-movable shipper-rod 81, the latter being fast with the shipper-rod 80, which controls the slidable clutch 79, the latter forming a part of the hoisting mechanism. The arms 109 and 80 are secured firmly to the shipper-rod 81 at such points that they control the two clutches 79 and 108 in a way to individually make the drum 76 and the sprocket 107 fast with the axle B. It is evident that the lever 86 may be moved a certain distance for the purpose of adjusting the shipper-rod 81 to a position whereby both of the clutches 79 and 108 are free from engagement with the drum 76 and the sprocket-wheel 107, respectively, thus allowing the clutch and drum to remain idle on the main axle B. If it is desired to bring the hoisting mechanism into service for the elevation of the barge G, the lever 86 is moved in one direction, so as to throw the clutch 79 into engagement with the drum 76 in order to rotate the latter and coil the cables on said drum for the elevation of the barge, the clutch 108 being at the same time shifted out of engagement with the sprocket-gear 107. After the barge shall have been raised and tilted to discharge its load the brake 88 is applied by the operation of the brake-lever 92 in order to hold the drum 76 from rotation, and the clutch 79 may now be shifted from engagement with the drum 76 by proper manipulation of the lever 86. When the machine is driven away from the stack, this lever 86 may be further manipulated to throw the clutch 108 into engagement with the sprocket-gear 107, and the brake-lever 92 may now be manipulated to release the brake-shoe 87 from the drum. The motion of the machine rotates the sprocket-gear 107, which serves to drive the counter-shaft 104 and control the drum 76, so that the cables will be gradually uncoiled from the drum and the empty barge will be lowered at a comparatively slow speed.

Having thus described my invention, I claim as new and desire to secure by Letters Patent—

1. A portable harvester and stacker having a main axle, a wheeled frame, vertical towers erected on said frame, vertical guides within said towers, wheeled carriages arranged to travel on said guides, a barge slidable between the towers, guide-plates fixed to said barge and having pivotal connection with the carriages, and means operated by the axle for bodily hoisting said carriages and the barge.

2. In a combined harvester and stacker, the combination with vertical guide-rails, of carriages arranged to travel on said rails, a barge, vertical guide-plates fixed to said barge and pivoted to said carriages, said guide-plates being provided with rollers which travel on the guide-rails and are adapted to be shifted with the barge when it is dumped, and a hoisting mechanism for bodily raising the carriages and the barge.

3. In a combined harvester and stacker, the combination of channeled rails, carriages fitted slidably to said rails and having rollers arranged to travel thereon, a barge, guide-plates fixed to the barge and having rollers which travel on the rails, means for connecting the guide-plates pivotally to said carriages, and a hoisting mechanism for bodily elevating the barge and the carriages.

4. In a portable harvester and stacker, the combination with a main axle, and a vertically-movable barge, of a hoisting mechanism operable by said axle and effective in bodily raising the barge, means for maintaining the barge in such raised position, and means controllable by the rotation of the axle for lowering the barge at a required speed.

5. In a portable harvester and stacker, the combination of a main axle, and a vertically-movable barge, of a hoisting-drum loose on said axle, hoisting-cables connected to the drum and to the barge, a brake mechanism cooperating with the drum, a lowering mechanism between the drum and the axle, and clutches between the axle and the drum for operating the hoisting mechanism or the lowering mechanism at will.

6. The combination with vertical guides, of slidable carriages having wheels arranged to ride against the guides and limited to vertical movement thereon, guide-plates pivoted to said carriages and having wheels also arranged to ride on the guides, a hoisting mechanism for the carriages, and a barge fixed to said guide-plates; the barge and its attached guide-plates being tiltable to a dumping position.

7. The combination with vertical guides, of wheeled carriages limited to slidable travel on the guides, each carriage having an offset guide-face, guide-plates pivoted near their lower ends to the carriages and having rollers near their upper ends disposed to ride on the guides, said guide-plates having offset feet arranged to ride against the offset guide-faces of the carriages, and a barge fixed to the guide-plates and movable therewith to a dumping position on the axis afforded by the pivotal connection between the carriages and the guide-plates.

8. In a combined harvester and stacker, the combination with suitable guides and traveling carriages adapted thereto, of a barge having pivotal connection with said carriages, plates fixed to the barge, and stops fastened adjustably to said plates and arranged to impinge the guide-rails, for limiting the dumping movement of the barge.

9. In a combined harvester and stacker, the combination of a main axle, a wheeled frame, suitable towers erected on said frame and provided with guides, a barge movable between the towers, wheeled carriages slidable on the guides and having pivotal connection with the barge, hoisting-cables attached to said barge, a hoisting-drum loose on the axle and having hoisting-cables attached thereto, means for clutching said drum to the axle, means for locking the drum against rotation, and means actuated by the axle for controlling the rotation of the drum and lowering the barge.

10. In a combined harvester and stacker, the combination of a main axle, a wheeled frame, vertical towers erected on the frame and having suitable guides, a barge movable between the towers, a hoisting-drum mounted loosely on said axle, hoisting-cables connected to the barge and coiled on said drum, a clutch controllable at will and arranged to make the drum fast with the axle, means for locking the drum against rotation when free from the clutch, and means for controlling the drum and lowering the barge by the rotation of the axle.

11. In a combined harvester and stacker, the combination with a barge and hoisting-cables therefor, of a main axle, a drum mounted loosely on said axle and held from endwise displacement thereon, a clutch for making said drum fast with the axle, means for locking the drum against rotation, and speed-reducing gearing between the drum and the axle.

12. In a combined harvester and stacker, the combination with a barge and hoisting-cables therefor, of an axle, a drum loose thereon, a clutch for making said drum fast with said axle, a brake interlocking with said drum, a train of speed-reducing gearing between the drum and the axle, and another clutch for throwing one member of said train of gearing into and out of fast relation with the axle.

In testimony whereof I have signed my name to this specification in the presence of two subscribing witnesses.

JOHN HENRY KINDSVATER.

Witnesses:
 FRED E. JACOBSON,
 ISAAC E. STEVENS.